3,354,166
N-SUBSTITUTED AMMONIUM SALTS OF MONO-
ESTERIFIED PHOSPHONIC ACIDS
Albert Y. Garner, Yellow Springs, Ohio, assignor to
Monsanto Research Corporation, St. Louis, Mo., a
corporation of Delaware
No Drawing. Filed Sept. 28, 1964, Ser. No. 399,819
9 Claims. (Cl. 260—293)

ABSTRACT OF THE DISCLOSURE

Provided as new compounds are N-substituted ammonium salts of mono-esterified phosphonic acids. The N-substituent must be either alicyclic or heterocyclic; e.g., cyclohexyl, furfuryl or piperidyl. The ester moiety may be lower alkyl or aryl of from 6 to 10 carbon atoms. An example is cyclohexylammonium phenyl phosphonate of the formula

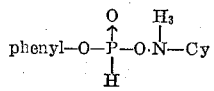

where Cy is cyclohexyl. The compounds are useful as antistatic agents for fibrous products and as germicides.

---

This invention relates to nitrogenous compounds of phosphorus and more particularly provides a new and valuable class of substituted ammonium compounds of certain phosphonic acid esters.

According to the invention, the new compounds are prepared by the reaction of certain phosphonates with water and an alicyclic or a heterocyclic amine, substantially according to the scheme:

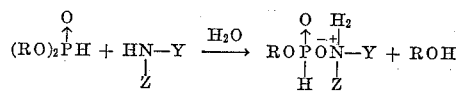

wherein R is selected from the class consisting of lower alkyl radicals and aryl radicals of from 6 to 10 carbon atoms, Y is selected from the class consisting of cycloalkyl radicals having from 5 to 6 carbon atoms in the ring and a total of from 5 to 8 carbon atoms, furfuryl and thenyl, and Z is hydrogen, and wherein Y and Z when taken together stand for a bivalent alkylene radical having from 2 to 5 carbon atoms in the alkylene chain and a total of from 2 to 8 carbon atoms and completing a ring with the nitrogen atom.

By "lower alkyl radicals" is meant any straight or branched-chain hydrocarbon alkyl group of from, say, 1 to 8 carbon atoms. The presently useful phosphonates may be simple diesters such as the dialkyl or diaryl phosphonates, including diethyl, diisopropyl, dibutyl, dipentyl, bis(2-ethylhexyl), diphenyl, di-p-tolyl, bis(m-butylphenyl), bis(2-cyclohexylphenyl) or di-β-naphthyl phosphonate; or they may be mixed diesters such as ethyl methyl, octyl propyl, hexyl phenyl, phenyl xylyl or methyl α-naphthyl phosphonate.

The amine component may be a cycloalkylamine, furfuryl amine or 2-thenylamine or a saturated, heterocyclic ring monoamine. Examples of useful cycloalkylamines are cyclopentylamine, cyclohexylamine, 2-, 3- or 4-methyl- or ethylcyclohexylamine, 2,4-dimethylcyclopentylamine, 3-methylcyclopentylamine, etc. The presently useful heterocyclic ring amines include ethylenimine, 2-methylaziridine, azetidine, 3-isobutylazetidine, piperidine, 2- or 4-pipecoline, pyrrolidine, etc.

As shown above, reaction of the phosphonate with the cyclic amine to give the ammonium compounds requires the presence of water and involves formation of an alcohol or a phenol as a by-product. The products are N-substituted ammonium salts of mono-esterified phosphonic acid. Thus, reaction of a cycloalkylamine such as, e.g., cyclopentylamine with a dialkyl phosphonate such as dimethyl phosphonate yields cyclopentylammonium methyl phosphonate with methanol as the by-product, thus:

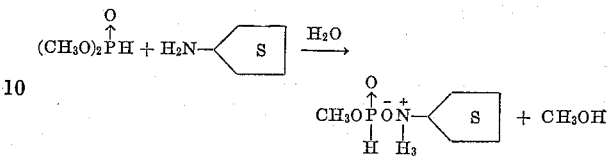

With furfurylamine or 2-thenylamine and the dialkyl, diaryl or alkyl aryl phosphonate, e.g., di-p-tolyl phosphonate, there is obtained, e.g., 2- or 3-furfuryl- or 2-thenylammonium phenyl phosphonate, the reaction proceedings as follows:

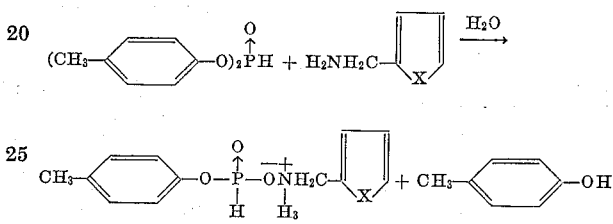

wherein X denotes oxygen or sulfur.

Use of a heterocyclic ring amine gives a quaternary base; thus, reaction of dibutyl phosphonate with pyrrolidine gives pyrrolidinium butyl phosphonate as follows:

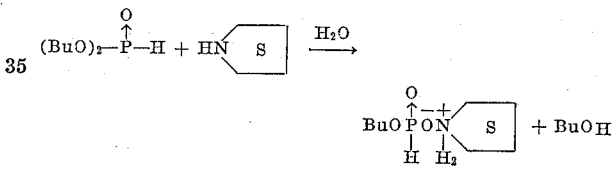

where Bu denotes the butyl radical.

Examples of other alicyclic heterocyclic ammonium phosphonates provided by the invention are cyclohexylammonium ethyl phosphonate, (3-methylcyclopentyl)ammonium phenyl phosphonate, (4-isopropylcyclopentyl)ammonium 2-ethylhexyl phosphonate, aziridium ethyl phosphonate, azetidium 4-butylphenyl phosphonate, 2-isopropylaziridinium pentyl phosphonate, (2,4-dimethylcyclohexyl)ammonium methyl phosphonate, pyrrolidinium ethyl phosphonate, 4-pipecolinium o-, m- or p-tolyl phosphonate, piperidinium propyl phosphonate, 2-pipecolinium xylyl phosphonate, piperidinium phenyl phosphonate, piperidinium butyl phosphonate, α- or β-naphthyl piperidinium phosphonate, pyrrolidinium phenyl phosphonate, cyclohexyammonium phenyl phosphonate, 2-furfurylammonium hexyl phosphonate, 2-furfurylammonium m-butylphenyl phosphonate, 2-furfurylammonium β-naphthyl phosphonate, phenyl 2-thenylammonium phosphonate, 2-thenylammonium methyl phosphonate, 2-thenylammonium isobutyl phosphonate, cyclohexylammonium n-octyl phosphonate, etc.

Reaction of the amine compound with the phosphonic acid diester takes place by simply mixing the two reactants in the presence of water at ordinary, decreased or increased temperature and in the presence or absence of an extraneous, inert organic liquid as diluent or solvent. The reaction is generally exothermic; hence, application of heat is usually unnecessary. However, in order to assure complete reaction, heating at a temperature of up to, say, 125° C. may be employed. A temperature of within the range of, say, from 15° C. to 125° C. is generally useful, operation at the higher temperatures within this range being conducted after the initial spontaneous temperature rise has subsided, in order to effect complete reaction within the shortest time. Since reaction occurs by participation of one mole each of the amine, the phosphonate, and water, these materials are advantageously used in at least the stoichiometric proportions; however, an excess of the phosphonate or the amine may be present, and such excess may conveniently serve as diluent. When an extraneous diluent or solvent is used, it may be any organic liquid which is inert under the reaction conditions, e.g., methanol or ethanol, ether, hexane, benzene, dioxane, or dimethyl sulfoxide. Although water should be present in at least an equimolar proportion, it is not generally recommended that it be used as the diluent, particularly when substantial heating is employed, since hydrolysis of either the ester reactant or ester product may occur in the presence of large quantities of water. It will usually be found that commercial preparations of the phosphonate and/or the amine and/or the diluent, when one is employed, often contain enough moisture to furnish the required molar equivalent of water.

Progress of the reaction may generally be followed by noting initial solubilization of the reaction mixture and subsequent change in viscosity. When no further change is evidenced, the reaction product consists of the ammonium compound and the alcohol or phenol by-product and diluent or solvent when one has been employed. The ammonium compound is readily separated from the reaction mixture by isolating procedures known to those skilled in the art, e.g., by precipitation, solvent extraction, volatilization of impurities, etc. The presently provided phosphorus-nitrogen compounds are usually soluble in the lower alcohols and insoluble in ether or acetone. If a lower dialkyl phosphonate has been used as reactant, the alkanol by-product may be removed from the reaction mixture by volatilization. When the phosphonate reactant is an aryl ester, the product ammonium compound can be isolated, for example, by mixing the crude reaction product with a liquid which is a non-solvent for said product and a solvent for the phenolic by-product.

The presently provided nitrogenous phosphonates are stable well-defined compounds which range from viscous liquids to crystalline solids. They are generally useful as antistatic agents for fibers and textile products, e.g., those of natural origin such as wool or of synthetic origin such as the cellulose esters, the polyacrylonitriles and nylon. The present compounds are also useful as biological toxicants, possessing germicidal properties at very low concentrations, say in quantities of from 0.001% to 1.0%.

The invention is further illustrated by, but not limited to, the following examples.

EXAMPLE 1

A mixture consisting of 30 ml. (0.2 mole) of diphenyl phosphonate and 20.0 g. (0.2 mole) of slightly moist cyclohexylamine was warmed for 20 minutes on the steam bath. When the resulting reaction mixture was allowed to cool, a solid gradually formed. The addition of acetone precipitated a flocculent white solid which was filtered off, washed with ether and air dried to give the substantially pure cyclohexylammonium phenyl phosphonate analyzing as follows:

Calc'd for $C_{12}H_{20}NO_3P$: Cr, 56.10%; H, 7.78%; N, 5.45%; P, 12.05%. Found: C, 55.60%; H, 8.20%; N, 5.91%; P, 11.85%.

Infrared absorption analysis showed the presence of P—H, P→O, and NH, thus agreeing with the structure.

Nuclear magnetic resonance analysis for $P^{31}$ also agrees with the structure; as evident from the following data:

$A = -20.2$ p.p.m.
$B = 19.9$ p.p.m.
Center of gravity $= -0.15$ p.p.m.
$J_{PH} =$ ca 650 c./s.

EXAMPLE 2

Dimethyl phosphonate (30 ml., 0.2 mole) was added slowly to 20.0 g. (0.2 mole) of slightly moist piperidine. The mixture turned yellow. Gentle warming on the steam bath caused vigorous reaction, with the temperature rising to above 160° C. After standing overnight at room temperature, the reaction mixture was washed well with ether, and the ether was decanted. The residue of ether-insoluble oil was evacuated for 8 hours at 40° C./1 mm., and then for 15 hours at 1 mm. and room temperature. There was thus obtained as residue 37.0 g. (87.0% theoretical yield) of the liquid, pale yellow, substantially pure piperidinium methyl phosphonate of the structure:

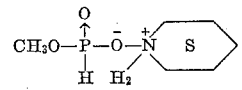

The compound, which was not crystallizable at Dry Ice temperature, analyzed as follows:

Calc'd for $C_6H_{16}NO_3P$: C, 39.75%; H, 8.84%; N, 7.74%; P, 17.11%. Found: C, 37.88%; H, 9.01%; N, 7.16%; P, 17.90%.

The infrared spectrum of the compound showed the presence of N—H, P—H and P→O, which is consistent with the structure.

Nuclear magnetic resonance analysis for $P^{31}$ gave the following chemical shifts, which are also in agreement with the structure:

$A = -22.3$ p.p.m
$B = -18.1$ p.p.m.
$C = 0.0$ p.p.m.
$D = 15.6$ p.p.m.
$E = 20.2$ p.p.m.
$J_{PH} =$ ca 615 c./s. and 620 c./s.

EXAMPLE 3

Diphenyl phosphonate (30 ml., 0.2 mole) was added to 20.0 g. (0.2 mole) of piperidine. The temperature rose to 69° C. Addition of about 20 ml. of water to the reaction mixture resulted in exothermic reaction, whereby the temperature rose to 105° C. The reaction mixture was allowed to cool to room temperature and then washed well with ether. After decanting the ether, the residual oil was evacuated for 16 hours at 40° C./1 mm. There was thus obtained as residue 32.6 g. of the substantially pure 1-piperidinium phenyl phosphonate, an amber syrup, $n_D^{26}$ 1.5283, analyzing 5.89% N as against 5.77%, the calculated value for $C_{11}H_{18}NO_3P$.

Infrared analysis showed the presence of N—H, $NH_4^+$, P→O, P—H, and P—O—$C_6H_5$, which is consistent with the structure.

Nuclear magnetic resonance $P^{31}$ analysis gave the following data, which also agrees with the structure:

$A = -20.2$ p.p.m.
$B = 19.6$ p.p.m.
$J_{PH} = 645$ p.p.m.

EXAMPLE 4

To 20 g. (0.2 mole) of furfurylamine in 10 ml. of distilled water there was added 30 ml. (0.2 mole) of diphenyl phosphonate. The resulting mixture was heated gently on the steam bath to about 100° C. and then allowed to stand at room temperature for 24 hours. At the end of that time the solvents were removed under vacuum and the residual oil was washed several times with ether. The ether-insoluble residue thus obtained was then heated at 40° C./1 mm. for 8 hours and at 25° C./1 mm. for 16 hours. There was thus obtained 47.5 g. (90.3% theoretical yield) of the substantially pure 2-furfurylammonium phenyl phosphonate, an amber oil, $n_D^{25}$ 1.5540, which analyzed 4.43% N as against 5.48%, the calculated value for $C_{11}H_{14}NO_4P$.

The infrared absorption spectrum showed the presence of N—H, P—H, P→O, P—O—$C_6H_5$, C—O—C, and $NH_4^+$, which is consistent with the structure.

Nuclear magnetic resonance analysis for $P^{31}$ gave the following chemical shifts, which also agree with the structure:

$A = 21.8$ p.p.m.
$B = 19.1$ p.p.m.
Center of gravity $= -1.35$ p.p.m.
$J_{PH} = $ ca 660 c./s.

The present invention is not to be considered as limited by the above examples which are given by way of illustration only. It will be obvious to those skilled in the art that many modifications can be made within the spirit of the invention, which is limited only by the terms of the appended claims.

What I claim is:
1. A compound of the formula

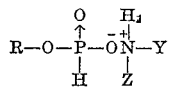

wherein R is selected from the class consisting of alkyl radicals of from 1 to 8 carbon atoms and aryl radicals of from 6 to 10 carbon atoms, Y is selected from the class consisting of cycloalkyl radicals having from 5 to 6 carbon atoms in the ring and a total of from 5 to 8 carbon atoms, furfuryl and thenyl, and Z is hydrogen and wherein Y and Z when taken together stand for a bivalent alkylene radical having from 2 to 5 carbon atoms in the alkylene chain and a total of from 2 to 8 carbon atoms and completing a ring with the nitrogen atom.

2. The compound defined in claim 1, further limited in that R is aryl, Y is cycloalkyl and Z is hydrogen.
3. The compound defined in claim 1, further limited in that R is aryl, Y is furfuryl and Z is hydrogen.
4. Piperidinium alkyl phosphonate wherein the alkyl radical has from 1 to 8 carbon atoms.
5. Piperidinium aryl phosphonate wherein the aryl radical has from 6 to 10 carbon atoms.
6. Cyclohexylammonium phenyl phosphonate.
7. 2-furfurylammonium phenyl phosphonate.
8. Piperidinium phenyl phosphonate.
9. Piperidinium methyl phosphonate.

References Cited
UNITED STATES PATENTS

| | | | | |
|---|---|---|---|---|
| 2,824,113 | 2/1958 | Zech | | 260—924 |
| 2,831,881 | 4/1958 | Bell | | 260—924 |
| 3,122,522 | 2/1964 | Harrison | | 210—293 |

WALTER A. MODANCE, *Primary Examiner.*

A. D. SPEVACK, *Assistant Examiner.*